United States Patent
Xu et al.

(10) Patent No.: US 12,368,647 B2
(45) Date of Patent: Jul. 22, 2025

(54) FEATURE ENGINEERING ORCHESTRATION METHOD AND APPARATUS

(71) Applicant: HUAWEI TECHNOLOGIES CO., LTD., Guangdong (CN)

(72) Inventors: Yixu Xu, Shanghai (CN); Jin Zhang, Shanghai (CN); Yan Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1075 days.

(21) Appl. No.: 17/080,588

(22) Filed: Oct. 26, 2020

(65) Prior Publication Data

US 2021/0042578 A1 Feb. 11, 2021

Related U.S. Application Data

(63) Continuation of application No. PCT/CN2019/083744, filed on Apr. 22, 2019.

(30) Foreign Application Priority Data

Apr. 28, 2018 (CN) .......................... 201810399920.3

(51) Int. Cl.
*H04L 41/14* (2022.01)
*G06F 18/211* (2023.01)
(Continued)

(52) U.S. Cl.
CPC .......... *H04L 41/145* (2013.01); *G06F 18/211* (2023.01); *G06F 18/214* (2023.01); *G06F 18/2411* (2023.01); *H04L 41/40* (2022.05)

(58) Field of Classification Search
CPC .. H04L 41/145; G06F 18/2411; G06F 18/211; G06F 18/214
See application file for complete search history.

(56) References Cited

U.S. PATENT DOCUMENTS 9,911,290 B1 * 3/2018 Zalewski ............. G07G 1/0072
10,039,016 B1 * 7/2018 Larish ................... H04W 24/02
(Continued)

FOREIGN PATENT DOCUMENTS

CN 101030835 A 9/2007
CN 103052964 A 4/2013
(Continued)

OTHER PUBLICATIONS

S. Huang, T. Han and N. Ansari, "Big-data-driven network partitioning for ultra-dense radio access networks," 2017 IEEE International Conference on Communications (ICC), Paris, France, 2017, pp. 1-6, doi: 10.1109/ICC.2017.7996364. (Year: 2017).*
(Continued)

*Primary Examiner* — James T Tsai
(74) *Attorney, Agent, or Firm* — WOMBLE BOND DICKINSON (US) LLP

(57) ABSTRACT

This application discloses a feature engineering orchestration method and apparatus. In the method, a first network device receives first indication information from a second network device, where the first indication information includes first method indication information and first data type indication information; the first network device performs, by using a method indicated by the first method indication information, feature extraction on data indicated by the first data type indication information, to obtain feature data, and sends the obtained feature data to the second network device; and the second network device performs model training based on the received feature data.

20 Claims, 12 Drawing Sheets

(51) Int. Cl.
  *G06F 18/214* (2023.01)
  *G06F 18/2411* (2023.01)
  *H04L 41/40* (2022.01)

(56) References Cited

U.S. PATENT DOCUMENTS

| | | | |
|---|---|---|---|
| 2004/0064450 A1 | 4/2004 | Hatano et al. | |
| 2012/0243427 A1* | 9/2012 | Brisebois | H04W 72/00 370/252 |
| 2013/0021199 A1* | 1/2013 | Fix | G01S 5/021 342/357.43 |
| 2015/0206068 A1 | 7/2015 | Davidovich et al. | |
| 2015/0287057 A1 | 10/2015 | Baughman et al. | |
| 2017/0099208 A1* | 4/2017 | Wang | H04L 69/16 |
| 2017/0193392 A1* | 7/2017 | Liu | G06N 20/00 |
| 2017/0257452 A1* | 9/2017 | Hoiles | G06N 3/08 |
| 2017/0262445 A1 | 9/2017 | Jeon et al. | |
| 2022/0029892 A1* | 1/2022 | Hooli | H04L 41/16 |
| 2022/0329524 A1* | 10/2022 | Sinha | H04L 41/0896 |

FOREIGN PATENT DOCUMENTS

| | | | | |
|---|---|---|---|---|
| CN | 103260187 A | | 8/2013 | |
| CN | 104809518 A | | 7/2015 | |
| CN | 105224623 A | | 1/2016 | |
| CN | 106534220 A | | 3/2017 | |
| CN | 106778259 A | | 5/2017 | |
| CN | 106980623 A | | 7/2017 | |
| CN | 107168965 A | * | 9/2017 | ........... G06F 16/285 |
| CN | 107180628 A | | 9/2017 | |
| CN | 107204010 A | | 9/2017 | |
| CN | 107741899 A | | 2/2018 | |
| CN | 110210506 A | * | 9/2019 | ........... G06K 9/6232 |
| WO | 2011002735 A1 | | 1/2011 | |
| WO | 2012103290 A1 | | 8/2012 | |
| WO | 2018028573 A1 | | 2/2018 | |

OTHER PUBLICATIONS

Huawei, Discussion about Big Data Driven Network Architecture. SA WG2 Meeting #121, May 15-19, 2017, Hangzhou, China, S2-173192, 11 pages.

Huawei, HiSilicon, Discussion on big data and 5G. SA WG2 Meeting #125, Jan. 22-26, 2018, Gothenburg, Sweden, S2-181250, 14 pages.

Ericsson, 5G QoS Parameters. SA WG2 Meeting #118-BIS Jan. 16-20, 2017 Spokane, WA, USA, S2-170138, 21 pages.

China Mobile, Key issue on how to get service information from AF. SA WG2 Meeting #125, Jan. 22-26, 2018, Gothenburg, Sweden, S2-180216, 2 pages.

* cited by examiner

| Feature method type | Feature method indication | Data type indication | Method parameter indication |
|---|---|---|---|
| Change of scale | $\log_2$ (logarithm to base 2)<br>lg (logarithm to base 10)<br>ln (logarithm to base e)<br>abs (calculating an absolute value)<br>sqrt (calculating a square root)<br>square (calculating a square)<br>cube (calculating a cube) | Data type | |
| Feature discretization | Binarization | Data type | Threshold |
| | Isometric discretization | Data type | Discrete interval |
| | Equal frequency discretization | Data type | Discrete interval |
| Abnormal smoothing | Z-score (standard score) | Data type | Confidence interval, standard deviation, and averaging value |
| | Threshold smoothing | Data type | Minimum threshold and maximum threshold |
| Normalization | Min max scaler (min-max normalization) | Data type | Minimum threshold and maximum threshold |
| | Z-score (standard score) | Data type list | |
| Standardization | Standard scale (standardization) | Data type | Averaging value and standard deviation |
| Dimension reduction | Avg (calculating an averaging value)<br>Min (calculating a minimum value)<br>Max (calculating a maximum value)<br>Sum (calculating a sum)<br>Others | Data type list | |
| Not process raw data | Default (no processing) | Data type | |

FIG. 6

FEATURE ENGINEERING ORCHESTRATION METHOD AND APPARATUS

CROSS-REFERENCE TO RELATED APPLICATIONS

This application is a continuation of International Patent Application No. PCT/CN2019/083744, filed on Apr. 22, 2019, which claims priority to Chinese Patent Application No. 201810399920.3, filed on Apr. 28, 2018. The disclosures of the aforementioned applications are hereby incorporated by reference in their entireties.

TECHNICAL FIELD

This application relates to the field of communications technologies, and in particular, to a feature engineering orchestration method and apparatus.

BACKGROUND

As shown in FIG. 1, machine learning may roughly include several operations of data collection, feature engineering, model training, and a prediction. The data collection means that various types of raw data are obtained from an object that generates a data source, and are stored in a database or a memory for data training or a prediction. The feature engineering means that relatively simple processing such as structuring, deduplication, and denoising may be performed on raw data, and then operations such as feature extraction and correlation analysis may be performed on processed data to obtain feature data. A model training process means that a proper algorithm, feature data, and the like are selected for training to obtain a model. Common algorithms include regression, a decision tree, a neural network, a support vector machine (SVM), a Bayes classifier, and the like. In a prediction process, new sample data is input into the model obtained through the training, and a corresponding output result may be obtained based on the model. Based on different algorithms, the output result may be a specific value, or may be a classification result. The output result is prediction content obtained through the machine learning.

Technical personnel introduce the machine learning into a communications network, and data is analyzed and predicted to optimize the communications network. In an access network, a base station sends raw data to an access network data analysis (RAN data analysis, (RANDA)) network element, and the RANDA network element performs feature engineering, training, and prediction functions. In a core network, a user plane function (UPF) sends raw data to a network data analysis (NWDA) network element, and the NWDA network element performs feature engineering, training, and prediction functions.

However, the base station and the UPF need to report a large amount of raw data, imposing a relatively high requirement on transmission performance. A transport network may fail to meet a transmission requirement, and network resources are also wasted.

SUMMARY

This application provides a feature engineering orchestration method and apparatus, to perform feature engineering and model training on data in a communications network.

According to a first aspect, this application provides a feature engineering orchestration method, including: receiving, by a first network device, first indication information from a second network device, where the first indication information may include first method indication information and first data type indication information; performing, by the first network device by using a method indicated by the first method indication information, feature extraction on data indicated by the first data type indication information, to obtain corresponding feature data; sending, by the first network device, the obtained feature data to the second network device; and performing, by the second network device, model training based on the received feature data.

In the foregoing method, the first network device may perform the feature extraction according to the method indicated by the second network device, and send the extracted feature data to the second network device. The first network device does not need to send a large amount of raw data to the second network device, so that transmission pressure can be reduced, a transmission requirement for a transport network can be reduced, and a computation amount of the second network device can be shared, thereby helping improve model training efficiency.

In one embodiment, the second network device may be a central unit (CU), and the first network device may be a distributed unit (DU). Alternatively, the second network device may be RANDA network element, and the first network device may be a CU, a DU, or a general NodeB (gNB). Alternatively, the second network device may be NWDA network element, and the first network device may be a UPF, an access management function (AMF), a session management function (SMF), or a policy control function (PCF). Alternatively, the second network device may be an analysis and modeling function (A & MF), and the first network device may be a data service function (DSF).

In one embodiment, the first indication information may further include first method parameter information. The first method parameter information is information about a parameter required when the method indicated by the first method indication information is used. In some embodiments, when indicating a first method, the second network device further needs to indicate a parameter required when the method is used. For example, if indicating the first network device to perform normalization processing on data, the second network device may further indicate a maximum threshold and a minimum threshold of normalized data.

In one embodiment, after performing the model training based on the received feature data, the second network device may further send, to the first network device, model information obtained through training. The first network device further performs a data prediction based on the received model information.

In the prior art, the first network device needs to report a large amount of raw data, so that the second network device performs a data prediction. However, in the foregoing embodiment of this application, the first network device only needs to perform the data prediction based on the model information sent by the second network device, so that the first network device can be prevented from sending a large amount of data, thereby reducing a requirement for a transport network.

In one embodiment, after performing the model training based on the received feature data, the second network device may further send, to a third network device, model information obtained through training. The third network device performs a data prediction based on the received model information. The second network device may be an A & MF, the first network device may be a DSF, and the third network device may be a model execution function (MEF).

In one embodiment, the model information includes model algorithm information and input feature information of a model. Specifically, the input feature information is used to obtain an input feature vector, and the input feature vector and the model algorithm information are used for the data prediction.

Further, the input feature information may further include second method indication information and second data type indication information.

If the first network device receives the model information sent by the second network device, the first network device may perform, by using a method indicated by the second method indication information, feature extraction on data indicated by the second data type indication information, to obtain the input feature vector, and then obtain a data prediction result based on the input feature vector and the model algorithm information.

If receiving the model information sent by the second network device, the third network device may send the input feature information to the first network device. The first network device performs, by using a method indicated by the second method indication information, feature extraction on data indicated by the second data type indication information, to obtain the input feature vector, and sends the input feature vector to the third network device. The third network device obtains a data prediction result based on the input feature vector and the model algorithm information.

In one embodiment, the input feature information further includes second method parameter information, and the second method parameter information is information about a parameter required when the method indicated by the second method indication information is used.

According to a second aspect, an embodiment of this application provides a first network device, including a receiving module, a processing module, and a sending module. The receiving module, the processing module, and the sending module are configured to perform functions performed by the first network device in any possible implementation of the first aspect.

According to a third aspect, an embodiment of this application provides a second network device, including a sending module, a receiving module, and a processing module. The sending module, the receiving module, and the processing module are configured to perform functions performed by the second network device in any possible implementation of the first aspect.

According to a fourth aspect, an embodiment of this application provides a first network device, including a processor, a memory, and a communications interface. The memory is configured to store a program, and the processor invokes the program stored in the memory, to perform, by using the communications interface, functions performed by the first network device in any possible implementation of the first aspect.

According to a fifth aspect, an embodiment of this application provides a second network device, including a processor, a memory, and a communications interface. The memory is configured to store a program, and the processor invokes the program stored in the memory, to perform, by using the communications interface, functions performed by the second network device in any possible implementation of the first aspect.

According to a sixth aspect, an embodiment of this application provides a communications system, which includes the first network device according to the second aspect and the second network device according to the third aspect or may include the first network device according to the fourth aspect and the second network device according to the fifth aspect.

According to a seventh aspect, an embodiment of this application provides a computer-readable storage medium, where the computer-readable storage medium stores a computer instruction, and when the instruction is run on a computer, the computer is enabled to perform the method in any implementation of the first aspect.

According to an eighth aspect, an embodiment of this application provides a computer program product including an instruction, where when the computer program product runs on a computer, the computer is enabled to perform the method in the foregoing aspects.

BRIEF DESCRIPTION OF DRAWINGS

FIG. 6 shows a common feature engineering method according to an embodiment of this application;

DESCRIPTION OF EMBODIMENTS

To make the objectives, technical solutions, and advantages of this application clearer, the following further describes this application in detail with reference to the accompanying drawings.

With the development of machine learning and artificial intelligence (AI), a communications network may analyze and predict data in a machine learning manner, to optimize a network. In the communications network, a large amount of raw data is generated by a base station and a UPF, but the base station and the UPF do not have a capability of analyzing and processing data. Therefore, the base station may send the large amount of raw data to RANDA network element, and the UPF may send the large amount of raw data to NWDA network element. The RANDA network element and the NWDA network element perform feature engineering and model training on the obtained raw data to obtain a model used for a data prediction, and then perform the data prediction based on new raw data sent by the base station or the UPF and by using the model obtained through training. However, in the foregoing process, because the base station or the UPF needs to report a large amount of raw data in a model training and prediction process, relatively high pressure is imposed on a transport network, and the transport network may fail to meet a transmission requirement for the transport network.

To resolve the foregoing problem, an embodiment of this application provides a feature engineering orchestration method, used to perform feature engineering and model training on data in a communications network, to reduce transmission pressure. The feature engineering orchestration method provided in this embodiment of this application may be applied to a 3/4/5G mobile communications network or another future communications network. The method may be applied to a radio access network (RAN), or may be applied to a core network (CN).

Figure 1:
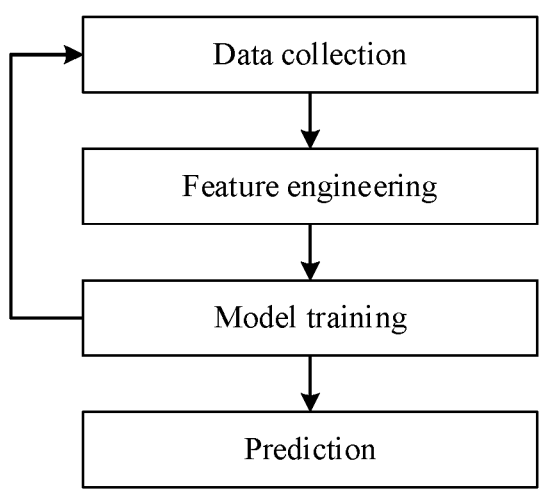
FIG. 1 is a schematic flowchart of machine learning according to an embodiment of this application.
Figure 2:
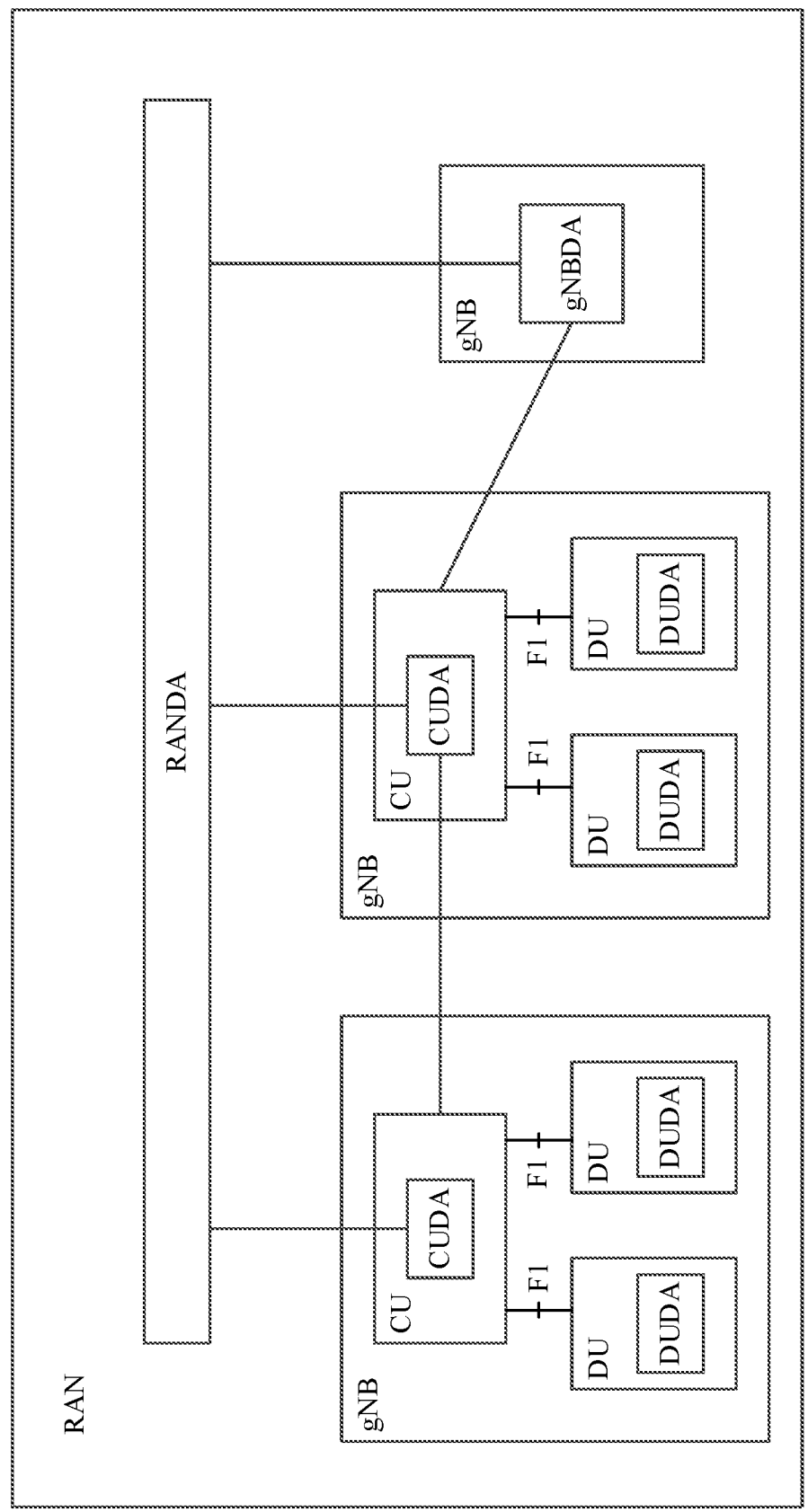
FIG. 2 is a schematic diagram of a RAN architecture in a 5G communications network according to an embodiment of this application.

FIG. 2 is a schematic diagram of an example of a RAN architecture, in a 5G communications network, that can be applied to embodiments of this application. As shown in FIG. 2, a general NodeB (gNB) included in a RAN may include a CU and a plurality of DUs, or may be an integrated gNB, that is, a gNB that does not include a DU.

The gNB may generate a large amount of raw data, which may be used for feature engineering, training, and a prediction. To analyze and process the data, a data analysis (DA) unit may be disposed in the gNB. For example, a data analysis unit disposed in the DU may be referred to as DUDA, and may be configured to perform statistical analysis, feature extraction, and the like on data in the DU. A data analysis unit disposed in the CU may be referred to as CUDA, and may be configured to: perform statistical analysis on data generated by the CU and data reported by the DU, and perform model training and the like based on the data. A data analysis unit disposed in the integrated gNB may be referred to as gNBDA, and may be configured to perform statistical analysis, feature extraction, and the like on data generated by the integrated gNB. The CUDA, the DUDA, and the gNBDA may be logical units in the gNB.

In addition, a data analysis unit, referred to as RANDA network element, may be further disposed in the radio access network, and may further perform statistics collection and analysis on data reported by the DUDA, the CUDA, and the gNBDA and perform model training and the like based on the data. Because the data obtained by the RANDA network element may be different from the data obtained by the CUDA, a model trained by the RANDA network element may also be different from a model trained by the CUDA. The RANDA network element may be a logical unit disposed in the gNB or another device, or may be an independent device. This is not limited in this application.

Figure 3:
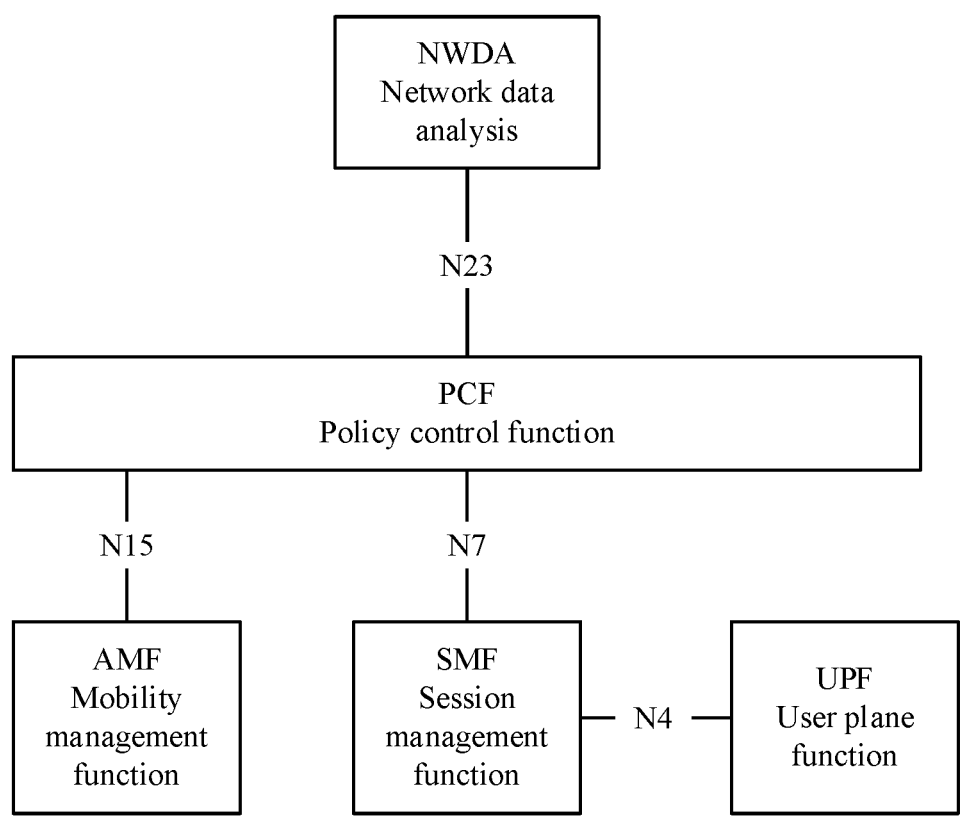
FIG. 3 is a schematic diagram of a CN architecture in a 5G communications network according to an embodiment of this application.

FIG. 3 is a schematic diagram of an example of a CN architecture, in a 5G communications network, that can be applied to embodiments of this application. A UPF may generate a large amount of raw data, which may be used for feature engineering, training, and a prediction. NWDA network element may perform analysis, processing and model training on the data. An AMF is mainly responsible for UE access and mobility management, NAS message routing, SMF selection, and the like. An SMF is mainly responsible for session management, such as session creation/modification/deletion, UPF selection, and user-plane tunnel information allocation and management.

Figure 4A:
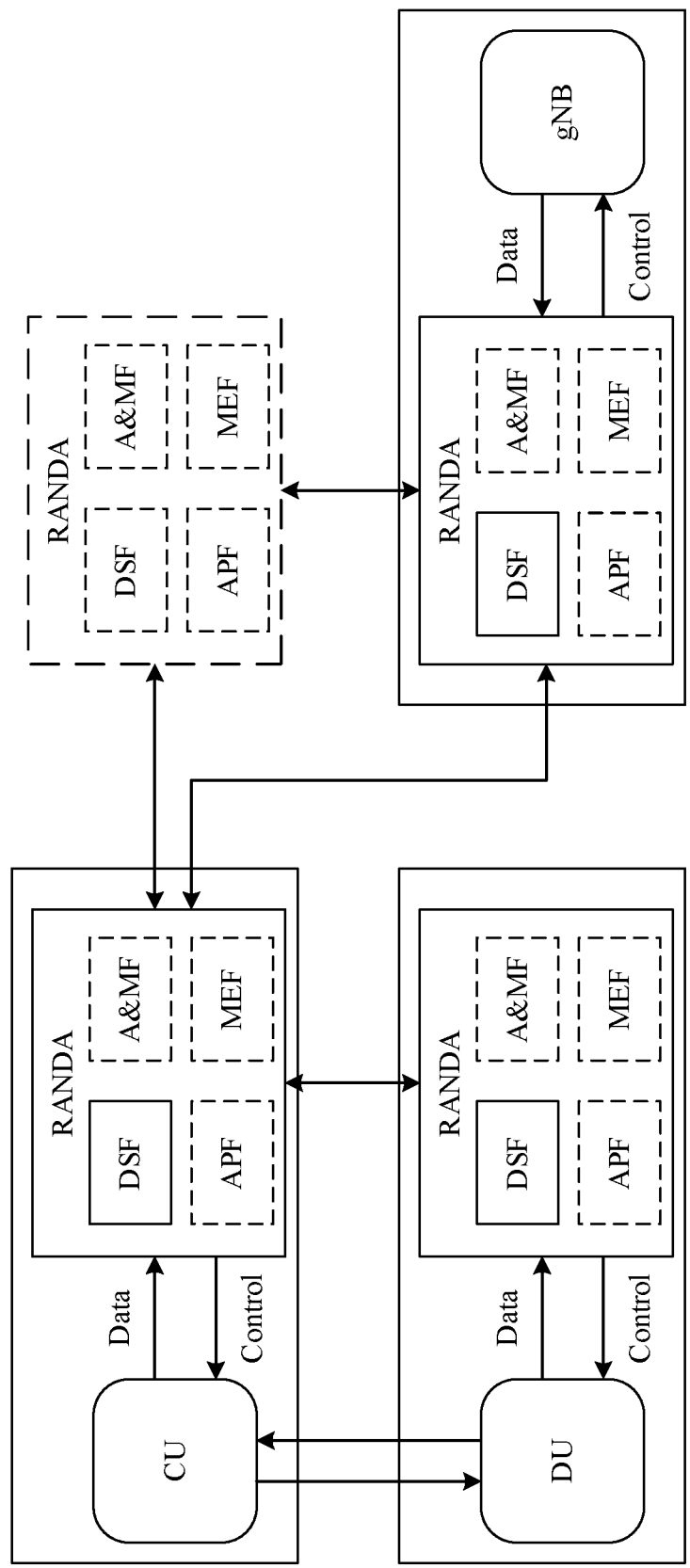
FIG. 4(a) is a schematic diagram of another RAN architecture in a 5G communications network according to an embodiment of this application.

FIG. 4(a) is a schematic diagram of an example of another RAN architecture, in a 5G communications network, that can be applied to embodiments of this application. As shown in FIG. 4(a), RANDA network element in a RAN may be a distributed logical unit that is distributed in a CU, a DU, a gNB, or an independent network device. The RANDA network element may include a DSF, used to provide a data service; an A & MF, used to perform analysis and modeling based on data provided by the DSF; and an MEF, used to perform a prediction based on a model obtained through A & MF training. Further, the RANDA network element may further include an adaptive policy function (APF), used to provide an intelligent collaboration service.

Function modules of the RANDA network element that are disposed in the CU, the DU, and the gNB may communicate with the CU, the DU, and the gNB. For example, the RANDA network element may send control information to the DU, to obtain raw data in the DU.

When the RANDA network element is disposed, a part or all of the function modules of the RANDA network element may be disposed in each DU, CU, gNB, or another network device based on an actual requirement. For example, the DSF is disposed in the DU, the CU, and the gNB, so that the DSF can easily obtain raw data from the CU, the DU, and the gNB. The A & MF may be disposed in the CU, so that the CU can perform model training based on data reported by the DU and data generated by the CU.

Figure 4B:
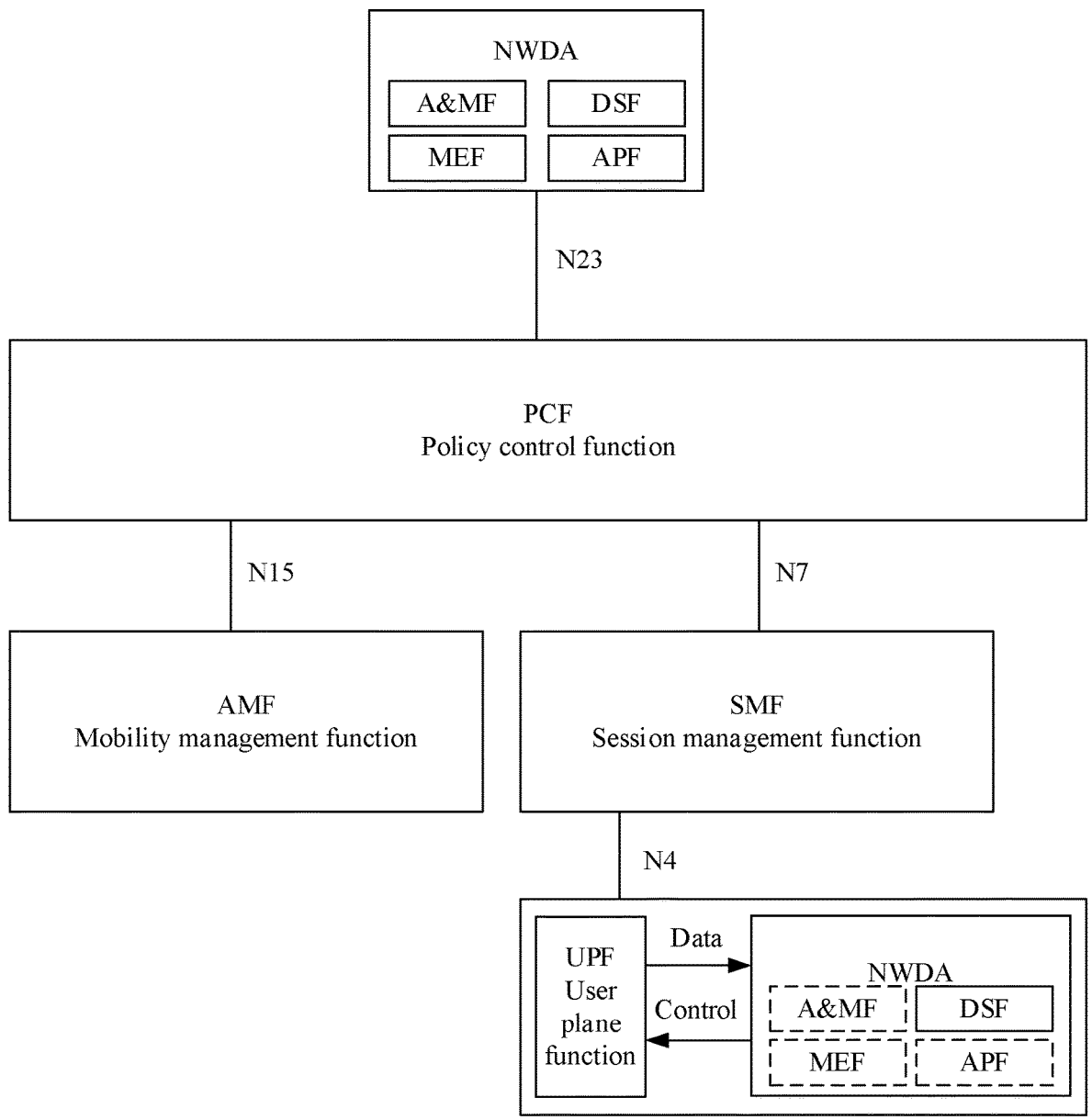
FIG. 4(b) is a schematic diagram of another CN architecture in a 5G communications network according to an embodiment of this application.

FIG. 4(b) is a schematic diagram of an example of another CN architecture, in a 5G communications network, that can be applied to embodiments of this application. As shown in FIG. 4(b), NWDA network element may be a distributed logical unit that is distributed in a UPF or another network element. The NWDA network element may also include a DSF, an A & MF, an MEF, and an APF, which have similar functions to those of corresponding modules in a RAN architecture. Details are not described herein again.

Figure 5:
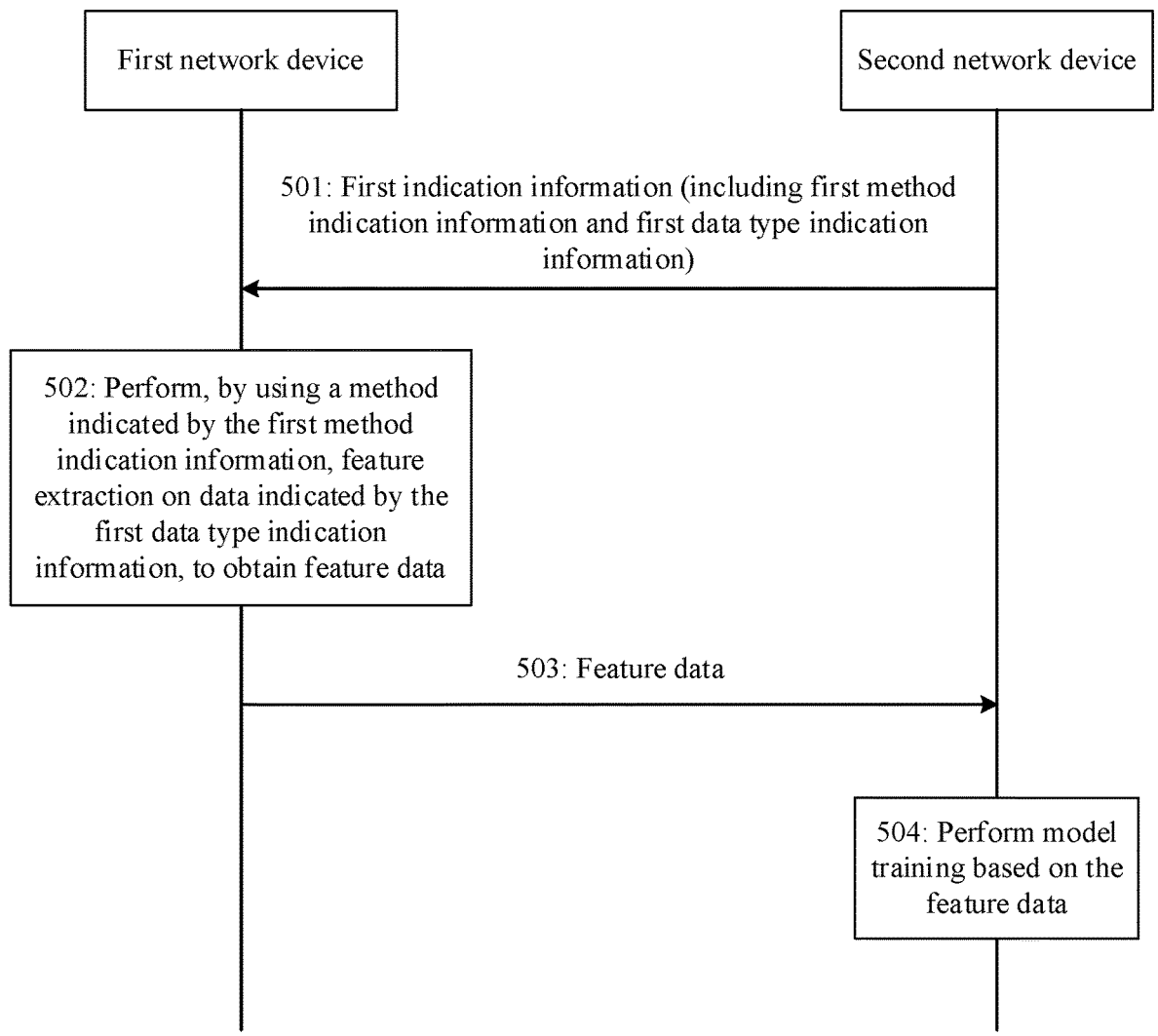
FIG. 5 is a schematic flowchart 1 of a feature engineering orchestration method according to an embodiment of this application.

The following describes in detail a feature engineering orchestration method provided in an embodiment of this application with reference to FIG. 5. As shown in FIG. 5, the method may include the following operations.

Operation 501: A second network device sends first indication information to a first network device, where the first indication information may include first method indication information and first data type indication information.

For example, when the method is applied to the architecture shown in FIG. 2, the second network device may be a CU, and the first network device may be a DU; or the second network device may be RANDA network element, and the first network device may be a CU, a DU, or a gNB. When the method is applied to the architecture shown in FIG. 3, the second network device may be NWDA network element, and the first network device may be a UPF, an AMF, an SMF, or a PCF.

When the method is applied to the architectures shown in FIG. 4(a) and FIG. 4(b), the second network device may be an A & MF, and the first network device may be a DSF.

The first indication information is used to subscribe to, from the first network device, feature information required by the second network device, that is, indicate the first network device to: perform, by using a method indicated by the first method indication information, feature extraction on data indicated by the first data type indication information, to obtain feature data, and send the obtained feature data to the second network device.

A common feature engineering method may be shown in FIG. 6. For example, if the method indicated by the first method indication information (namely, a "feature method indication" in FIG. 6) is calculating an averaging value, and the first data type indication information indicates data of a reference signal received power (RSRP), it indicates that the second network device requests to subscribe to an averaging value of an RSRP. For another example, if the method indicated by the first method indication information is calculating a minimum value, and the first data type indication information indicates an RSRP for a station 1 (namely, a received power that is reported by a terminal and that is of a reference signal sent by the station 1, and a station may be a cell, a base station, or the like), an RSRP for a station 2, and an RSRP for a station 3, it indicates that the second network device requests to subscribe to a minimum value of RSRPs measured by the terminal for the three stations.

In a specific embodiment, each method may be numbered in advance. In this case, the first method indication information may be indicated by using a corresponding method number. For example, a number 1 means calculating an averaging value, a number 2 means calculating a minimum value, and a number 3 means calculating a maximum value.

It can be learned from FIG. 6 that, in some feature methods, feature extraction may be performed without a method parameter, for example, calculating the maximum value and calculating the minimum value. However, in some feature methods, some method parameters further need to be provided to implement corresponding feature extraction. For example, when "min-max normalization" is applied for normalization, whether to normalize a value of data to a value between 0 and 1 or normalize a value of data to a value between 0 and 100 further needs to be determined. In other words, a minimum threshold and a maximum threshold further need to be determined. For another example, when "isometric discretization" is applied to discretize the RSRP, a discrete interval further needs to be determined to discretize data. Specifically, the data may be discretized to several value intervals of [−150, −130], [−130, −110], [−110, −90], and [−90, −70], and then an amount of data that falls within each value interval is counted.

For the foregoing case, the second network device may send the first indication information including first method parameter information to the first network device, so that the first network device can implement the feature extraction. For example, the first indication information includes the following information: the first method indication information, where an indicated method is the min-max normalization; the first data type indication information, indicating the data of the RSRP; and the first method parameter information, indicating that a minimum value is 0 and a maximum value is 1.

In addition, a parameter corresponding to each method may also be agreed on in advance and configured in the first network device. In this case, the first indication information sent by the second network device may not necessarily carry the method parameter indication information.

In one embodiment, when a same method corresponds to different parameters, different numbers may be used for an indication. For example, a number 1 indicates that a method is the min-max normalization, a minimum value is 0, and a maximum value is 1; and a number 2 indicates that a method is the min-max normalization, a minimum value is 0, and a maximum value is 100.

Further, when the same method is applied to different types of data, different numbers may also be used for an indication. For example, a number 1 indicates that a method is calculating the averaging value, and a data type is the data of the RSRP; and a number 2 indicates that a method is calculating the averaging value, and a data type is an air interface transmission rate. Alternatively, different numbers may correspond to different combinations of methods, data types, and method parameters, which are not described one by one herein.

Operation 502: The first network device performs, by using the method indicated by the first method indication information, the feature extraction on the data indicated by the first data type indication information, to obtain the feature data.

In one embodiment, after receiving the first indication information, the first network device may periodically and repeatedly perform the foregoing operations, or may perform the foregoing operations after new data indicated by a first data type is generated.

In some embodiments, after receiving the first indication information sent by the second network device, the first network device may return, to the second network device, response information indicating whether the feature extraction can be performed based on the first indication information. For example, the first network device and the second network device agree on 10 methods in advance, which respectively correspond to numbers 1 to 10. The second network device can support a new method 11 after being upgraded, but the first network device is not upgraded, is not configured with an algorithm corresponding to the method 11, and cannot perform the feature extraction by using the method 11. In this case, the first network device may send response information to the second network device, to indicate that the feature extraction indicated by the first indication information is not supported. The procedure ends. If the first network device can perform the feature extraction based on the first indication information, the first network device may send response information to the second network device, to indicate that the feature extraction indicated by the first indication information is supported, and perform operation 502.

Operation 503: The first network device sends the obtained feature data to the second network device.

In one embodiment, the first network device may periodically send obtained feature data to the second network device based on an indication that is agreed on in advance or that is of the second network device, or send new feature data to the second network device in a timely manner after obtaining the new feature data.

Operation 504: The second network device performs model training based on the feature data.

Specifically, the second network device may perform the model training based on a preset algorithm and the feature data sent by the first network device, to obtain a model used for a data prediction.

In one embodiment, after performing operation 504, the second network device may send, to the first network device or a third network device, model information obtained through the training, so that the first network device or the third network device can perform a data prediction based on the model information, to avoid a problem that the first network device still needs to send a large amount of raw data to the second network device in a data prediction process, further reduce pressure on a transport network, and further share a computation amount of the second network device, thereby helping improve system efficiency.

In addition, the model information sent by the second network device may further include model algorithm information and input feature information. Specifically, the input feature information is used to indicate how to obtain an input feature vector, and the obtained input feature vector and the model algorithm information are used for the data prediction.

Specifically, if the second network device sends the model information to the first network device, the first network device may perform the data prediction based on the generated new data and the model information. Compared with a prediction process in the prior art, on the one hand, this process avoids sending of the large amount of raw data to the second network device, thereby reducing the pressure on the transport network; on the other hand, the second network device can locally perform the feature extraction on the raw data, and perform the prediction based on the extracted feature vector. This helps reduce duration of the prediction process, so that a prediction result of a network can be relatively quickly obtained, and the network can be optimized in a timely manner.

If the second network device sends the model information to the third network device, the third network device may send the input feature information to the first network device. The first network device performs the feature extraction on the raw data based on the input feature information, and sends the extracted input feature vector to the third network device. The third network device performs the data prediction based on the input feature vector and the model algorithm information. Compared with a prediction process in the prior art, this process avoids reporting of the large amount of raw data, and reduces transmission pressure on the transport network.

Further, the input feature information may include second method indication information and second data type indication information, and is used to indicate to perform, by using a method indicated by the second method indication information, feature extraction on data indicated by the second data type indication information, to obtain the input feature vector. In addition, similar to the first indication information, second indication information may also include second method parameter information, namely, information about a parameter required when the method indicated by the second method indication information is used.

Figure 7:
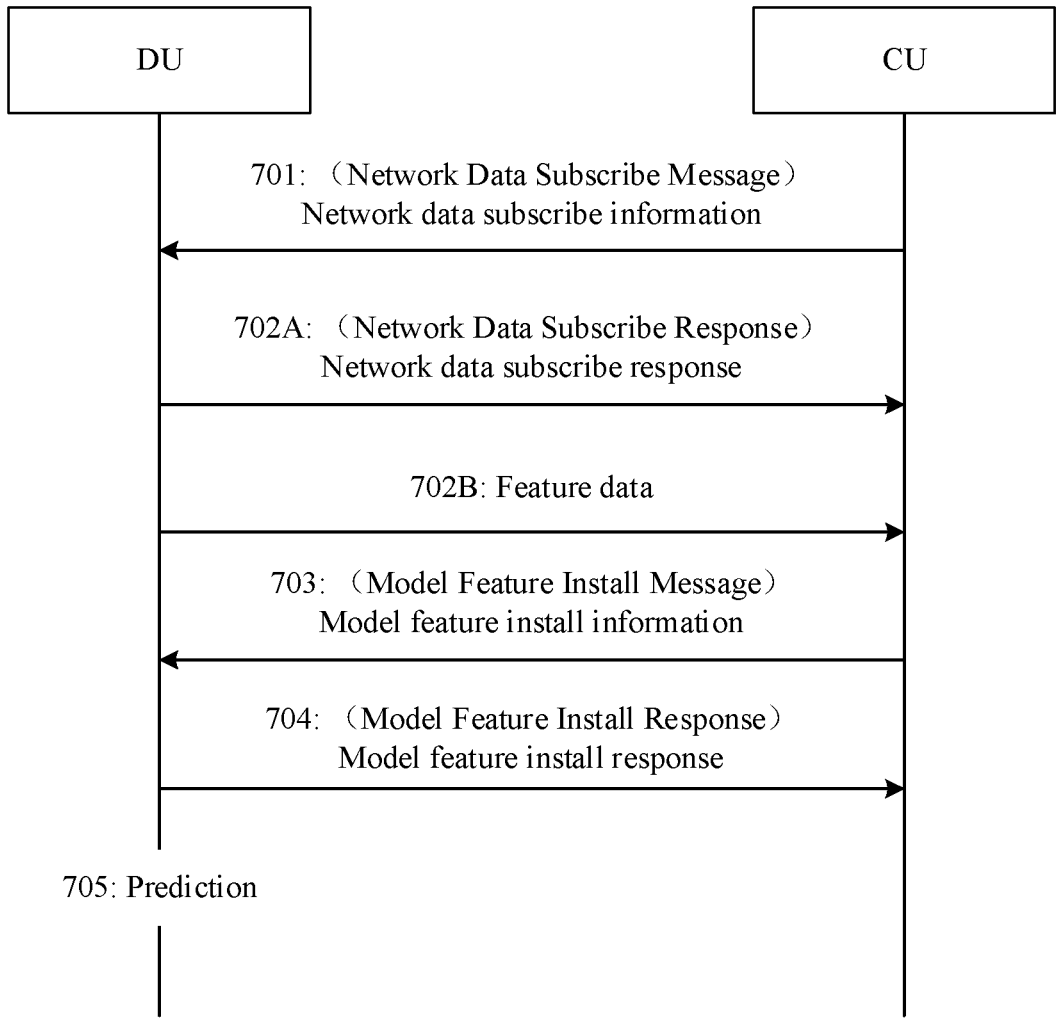
FIG. 7 is a schematic flowchart 2 of a feature engineering orchestration method according to an embodiment of this application.

The following describes the foregoing embodiment in detail with reference to a specific application scenario. As described above, the feature engineering orchestration method provided in the embodiments of this application may be applied to a RAN. When the feature engineering orchestration method is applied to the RAN, the second network device may be a CU, and the first network device may be a DU. As shown in FIG. 7, a specific implementation process may include the following operations.

Operation 701: The CU sends a network data subscribe message to the DU, where the network data subscribe message includes first indication information. The first indication information includes first method indication information and first data type indication information.

In one embodiment, the CU may send the network data subscribe message including the first indication information, or may send another message including the first indication information, or send the first indication information by using one piece of independent signaling.

Operation 702A: The DU sends a network data subscribe response to the CU, to notify the CU of whether the DU can perform feature extraction based on the first indication information.

If the DU cannot perform the feature extraction based on the first indication information, the foregoing response may further include indication information of an unsupported method or an unsupported data type.

If the DU can perform the feature extraction based on the first indication information, operation 702B continues to be performed.

Operation 702B: The DU performs the feature extraction based on the first indication information, and sends obtained feature data to the CU.

Operation 703: The CU performs model training based on the feature data sent by the DU, and sends a model feature install message including obtained model information to the DU.

The model information may include model algorithm information and input feature information. The input feature information is used to indicate how to obtain an input feature vector, and the input feature vector and the model algorithm information are used for a data prediction.

Further, the input feature information includes second method indication information and second data type indication information.

Operation 704: The DU sends a model feature install response to the CU, to notify the CU of whether the DU can perform the data prediction based on the model information.

If the DU cannot perform the data prediction based on the model algorithm information and the input feature information, the foregoing response may further include indication information of an unsupported method or an unsupported data type.

If the DU can perform the data prediction based on the model algorithm information and the input feature information, operation 705 continues to be performed.

Operation 705: The DU obtains the input feature vector based on the input feature information, and performs the prediction based on the input feature vector and the model algorithm information.

Figure 8:
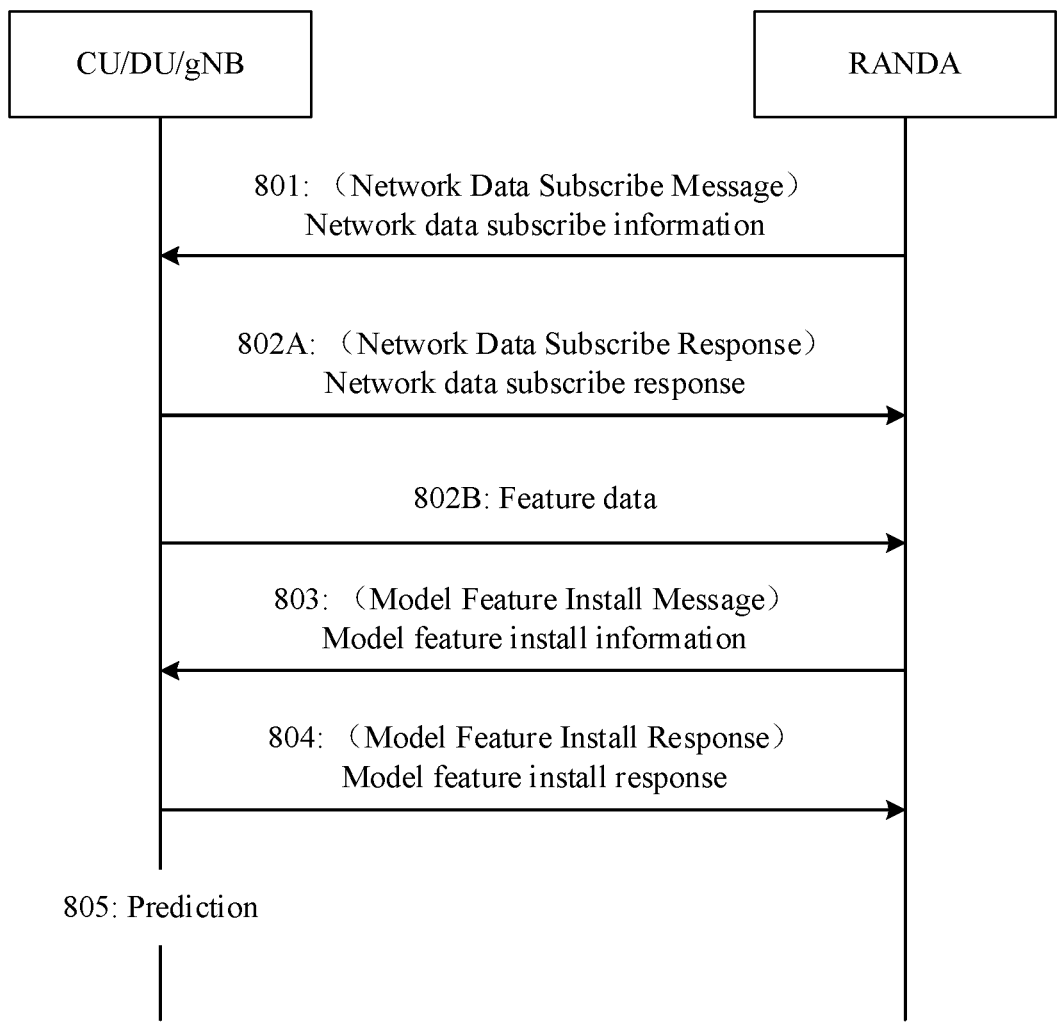
FIG. 8 is a schematic flowchart 3 of a feature engineering orchestration method according to an embodiment of this application.

When the foregoing feature engineering orchestration method is applied to the RAN, the second network device may be RANDA network element, and the first network device may be a CU, a DU, or a gNB. As shown in FIG. 8, a specific implementation process may include the following operations.

Operation 801: The RANDA network element sends a network data subscribe message to the CU/DU/gNB, where the message includes first indication information, and the first indication information may include first method indication information and first data type indication information.

Operation 802A: The CU/DU/gNB sends a network data subscribe response to the RANDA network element, to notify the RANDA network element of whether the CU/DU/gNB can perform feature extraction based on the first indication information.

If the CU/DU/gNB can perform the feature extraction based on the first indication information, operation 802B continues to be performed.

Operation 802B: The CU/DU/gNB performs the feature extraction based on the first indication information, and sends obtained feature data to the RANDA network element.

Operation 803: The RANDA network element performs model training based on the feature data, and sends a model feature install message including obtained model information to the CU/DU/gNB. The model information may include model algorithm information and input feature information.

Operation 804: The CU/DU/gNB sends a model feature install response to the RANDA network element, to notify the RANDA network element of whether the CU/DU/gNB can perform a data prediction based on the model algorithm information and the input feature information.

If the CU/DU/gNB can perform the data prediction based on the model algorithm information and the input feature information, operation 805 continues to be performed.

Operation 805: The CU/DU/gNB obtains an input feature vector based on the input feature information, and performs the prediction based on the input feature vector and the model algorithm information.

Figure 9:
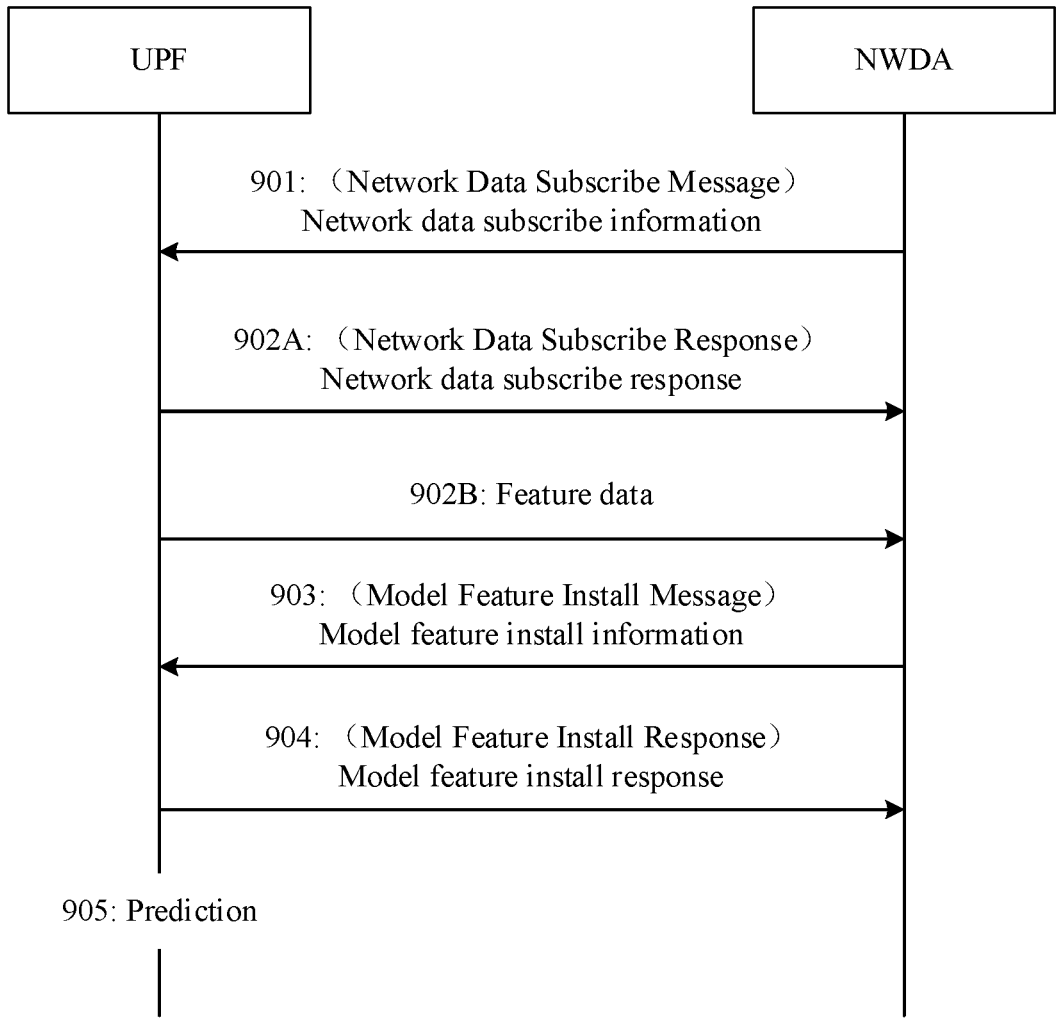
FIG. 9 is a schematic flowchart 4 of a feature engineering orchestration method according to an embodiment of this application.

When the foregoing feature engineering orchestration method is applied to a CN, the second network device may be NWDA network element, and the first network device may be a UPF, an AMF, an SMF, or a PCF. As shown in FIG. 9, when the second network device is the NWDA network element, and the first network device is the UPF, a specific implementation process may include the following operations.

Operation 901: The NWDA network element sends a network data subscribe message to the UPF, where the message includes first indication information, and the first indication information may include first method indication information and first data type indication information.

Operation 902A: The UPF sends a network data subscribe response to the NWDA network element, to notify the NWDA network element of whether the UPF can perform feature extraction based on the first indication information.

If the UPF can perform the feature extraction based on the first indication information, operation 902B may continue to be performed.

Operation 902B: The UPF performs the feature extraction based on the first indication information, and sends obtained feature data to the NWDA network element.

Operation 903: The NWDA network element performs model training based on the feature data, and sends a model feature install message including obtained model information to the UPF. The model information includes model algorithm information and input feature information.

Operation 904: The UPF sends a model feature install response to the NWDA network element, to notify the NWDA network element of whether the UPF can perform a data prediction based on the model algorithm information and the input feature information.

If the UPF can perform the data prediction based on the model algorithm information and the input feature information, operation 905 continues to be performed.

Operation 905: The UPF obtains an input feature vector based on the input feature information, and performs the prediction based on the input feature vector and the model algorithm information.

In addition, the feature engineering orchestration method provided in the embodiment of this application may be further applied to the architecture shown in FIG. 4(a) or FIG. 4(b). In this case, the second network device is an A & MF, and the first network device is a DSF. Further, after a training model is obtained, the third network device that performs a data prediction based on the model may be an MEF. A CN scenario is used as an example. When NWDA network element is disposed, a function module DSF of the NWDA network element may be disposed in the UPF, so that the DSF can easily obtain raw data generated by the UPF. The A & MF and the MEF may be disposed in the UPF, or may be disposed in another network device, or may be disposed in an independent network device based on requirements of different scenarios.

Figure 10:
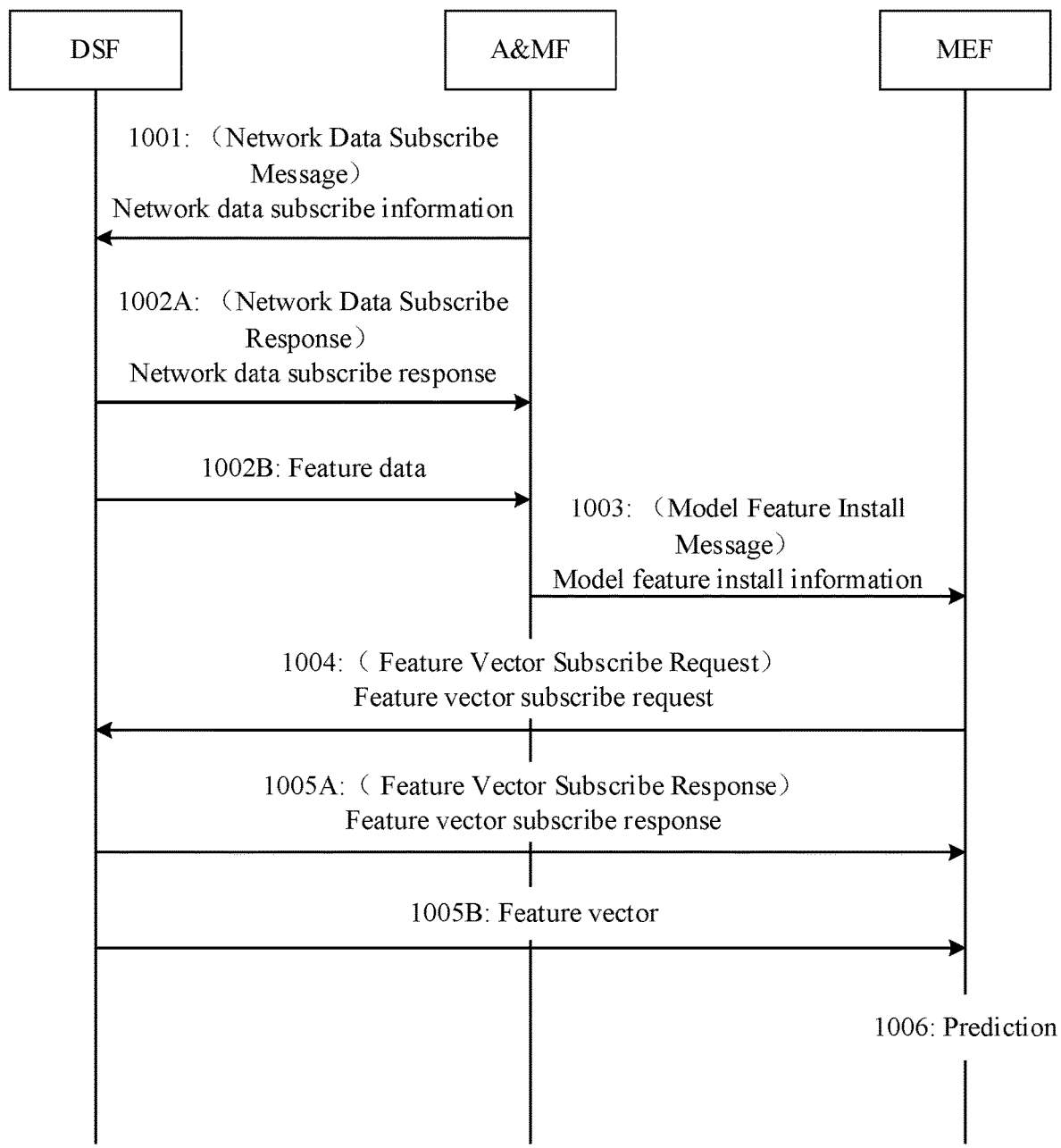
FIG. 10 is a schematic flowchart 5 of a feature engineering orchestration method according to an embodiment of this application.

A specific process may be shown in FIG. 10, and may include the following operations.

Operation 1001: The A & MF sends a network data subscribe message to the DSF, where the message includes first indication information, and the first indication information may include first method indication information and first data type indication information.

In one embodiment, the first indication information may further include first method parameter information.

Operation 1002A: The DSF sends a network data subscribe response to the A & MF, to notify the A & MF of whether the DSF can perform feature extraction based on the first indication information.

If the DSF cannot perform the feature extraction based on the first indication information, the foregoing response may include indication information of an unsupported method or an unsupported data type.

If the DSF can perform the feature extraction based on the first indication information, operation 1002B continues to be performed.

Operation 1002B: The DSF performs, by using a method indicated by the first method indication information, the feature extraction on data indicated by the first data type indication information, and sends obtained feature data to the A & MF.

Operation 1003: The A & MF performs model training based on the feature data sent by the DSF, and sends a model feature install message including obtained model information to the MEF. The model information includes model algorithm information and input feature information.

The input feature information may include second method indication information and second data type indication information. Further, the input feature information may further include second method parameter information, namely, information about a parameter required when a method indicated by the second method indication information is used.

Operation 1004: The MEF sends a feature vector subscribe message to the DSF, where the message includes the input feature information, to subscribe to an input feature vector from the DSF.

Operation 1005A: The DSF sends a feature vector subscribe response to the MEF, to notify the MEF of whether the DSF can obtain the input feature vector based on the input feature information.

If the DSF cannot perform the feature extraction based on the input feature information, the foregoing response may further include the indication information of the unsupported method or the unsupported data type. For example, if the method indicated by the second method indication information is not configured in the DSF, the response returned to the MEF may carry the indication information of the unsupported method.

If the DSF can perform the feature extraction based on the input feature information, operation 1005B continues to be performed.

Operation 1005B: The DSF obtains the input feature vector based on the input feature information, and sends the obtained input feature vector to the MEF.

Specifically, the DSF may perform, by using the method indicated by the second method indication information, the feature extraction on data indicated by the second data type indication information, to obtain the input feature vector.

Operation 1006: The MEF performs a data prediction based on the model algorithm information sent by the A & MF and the input feature vector sent by the DSF.

In the foregoing feature engineering orchestration method, the first network device may perform the feature extraction according to the method indicated by the second network device, and send the extracted feature data to the second network device, so that the first network device does not need to send a large amount of raw data to the second network device, network transmission pressure can be reduced, a requirement for a transport network can be reduced, and a computation amount of the second network device can be shared, thereby helping improve model training efficiency. Further, the first network device may further perform the data prediction based on the model information sent by the second network device. Alternatively, the first network device may further obtain the input feature vector based on the input feature information sent by the third network device, and send the input feature vector to the first network device or the third network device, to avoid transmitting of the large amount of raw data in a data prediction process, thereby further reducing the network transmission pressure.

Figure 11:
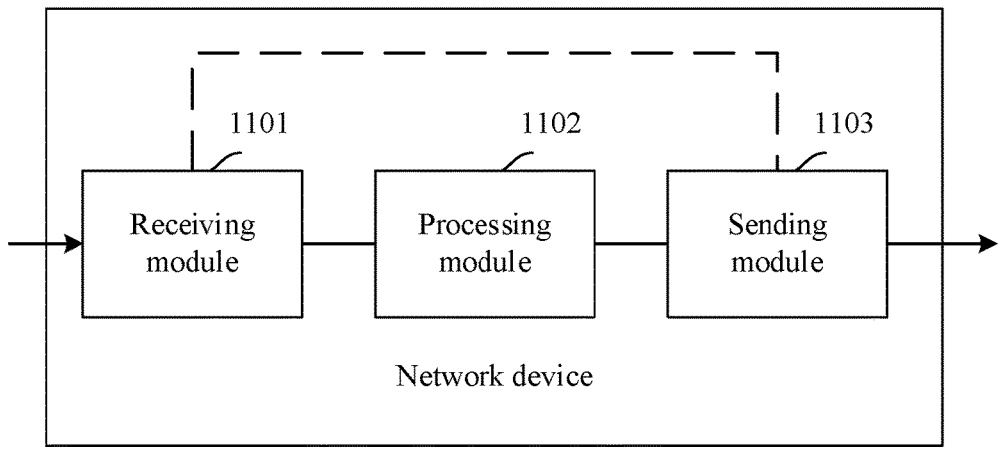
FIG. 11 is a schematic structural diagram 1 of a network device according to an embodiment of this application.

Based on a same technical concept, an embodiment of this application provides a first network device, configured to implement a method procedure of the first network device in the foregoing method embodiments. FIG. 11 is a schematic structural diagram of a first network device according to an embodiment of this application. As shown in the figure, the first network device includes a receiving module 1101, a processing module 1102, and a sending module 1103.

In one embodiment, the first network device may be an independent device, or may be a function module disposed in another device. For example, a DSF may be disposed in a DU, a CU, a gNB, and a UPF as a function module.

The receiving module 1101 is configured to receive first indication information from a second network device, where the first indication information includes first method indication information and first data type indication information.

The processing module 1102 is configured to perform, by using a method indicated by the first method indication information, feature extraction on data indicated by the first data type indication information, to obtain feature data.

The sending module 1103 is configured to send the feature data to the second network device.

In one embodiment, the first indication information further includes first method parameter information, and the first method parameter information is information about a parameter required when the method indicated by the first method indication information is used.

In one embodiment, after the sending module 1103 sends the feature data to the second network device, the receiving module 1101 is further configured to receive model information from the second network device, where the model information is obtained by performing model training based on the feature data. The processing module 1102 is further configured to perform a data prediction based on the model information.

In one embodiment, the model information includes model algorithm information and input feature information of the model. When performing the data prediction based on the model information, the processing module 1102 is specifically configured to: obtain an input feature vector based on the input feature information, and then perform the data prediction based on the input feature vector and the model algorithm information.

In one embodiment, the input feature information includes second method indication information and second data type indication information. When obtaining the input feature vector based on the input feature information, the processing module 1102 is specifically configured to perform, by using a method indicated by the second method indication information, feature extraction on data indicated by the second data type indication information, to obtain the input feature vector.

In one embodiment, the input feature information further includes second method parameter information, and the second method parameter information is information about a parameter required when the method indicated by the second method indication information is used.

In one embodiment, after the sending module 1103 sends the feature data to the second network device, the receiving module 1101 is further configured to receive second indication information from a third network device, where the second indication information includes third method indication information and third data type indication information. The processing module 1102 is further configured to perform, by using a method indicated by the third method indication information, feature extraction on data indicated by the third data type indication information, to obtain an input feature vector. The sending module 1103 is further configured to send the input feature vector to the third network device.

In one embodiment, the input feature information further includes third method parameter information, and the third method parameter information is information about a parameter required when the method indicated by the third method indication information is used.

Based on a same technical concept, an embodiment of this application provides a second network device, configured to implement a method procedure of the second network device in the foregoing method embodiments. The second network device includes a sending module, a receiving module, and a processing module. A connection manner between the foregoing modules is similar to the connection manner in FIG. 11.

In one embodiment, the second network device may be an independent device, or may be a function module disposed in another device. When the second network device is a function module, the second network device and a first network device may be disposed in a same device. For example, a DSF and an A & MF may be disposed in a CU.

Specifically, the sending module is configured to send first indication information to the first network device, where the first indication information includes first method indication information and first data type indication information.

The receiving module is configured to receive feature data from the first network device, where the feature data is obtained by performing, by using a method indicated by the first method indication information, feature extraction on data indicated by the first data type indication information.

The processing module is configured to perform model training based on the feature data.

In one embodiment, after the processing module performs the model training based on the feature data, the sending module is further configured to send, to the first network device, model information obtained through training, where the model information is used for a data prediction.

In one embodiment, after the processing module performs the model training based on the feature data, the sending module is further configured to send, to a third network device, model information obtained through training, where the model information is used for a data prediction.

In one embodiment, the model information includes model algorithm information and input feature information. The input feature information is used to obtain an input feature vector, and the input feature vector and the model algorithm information are used for the data prediction.

In one embodiment, the input feature information includes second method indication information and second data type indication information, and is used to indicate to perform, by using a method indicated by the second method indication information, feature extraction on data indicated by the second data type indication information, to obtain the input feature vector.

In one embodiment, the input feature information further includes second method parameter information, and the second method parameter information is information about a parameter required when the method indicated by the second method indication information is used.

In one embodiment, the first indication information further includes first method parameter information, and the first method parameter information is information about a parameter required when the method indicated by the first method indication information is used.

Based on a same technical concept, an embodiment of this application provides a third network device, configured to implement a method procedure of the third network device in the foregoing method embodiments. The third network device includes a receiving module, a sending module, and a processing module. A connection manner between the foregoing modules is similar to the connection manner in FIG. 11.

In one embodiment, the third network device may be an independent device, or may be a function module disposed in another device. When the third network device is a function module, the third network device and a first network device or a second network device may be disposed in a same device. For example, a DSF and an MEF may be disposed in a DU, or a DSF, an A & MF, and an MEF may be disposed in a CU.

Specifically, the receiving module is configured to receive model information sent by the second network device, where the model information includes model algorithm information and input feature information of the model.

The sending module is configured to send the input feature information to the first network device.

The receiving module is further configured to receive an input feature vector determined by the first network device based on the input feature information.

The processing module is configured to obtain a data prediction result based on the input feature vector and the model algorithm information.

In one embodiment, the input feature information includes second method indication information and second data type indication information, and is used to indicate to perform, by using a method indicated by the second method indication information, feature extraction on data indicated by the second data type indication information, to obtain the input feature vector.

In one embodiment, the input feature information further includes second method parameter information, and the second method parameter information is information about a parameter required when the method indicated by the second method indication information is used.

Figure 12:
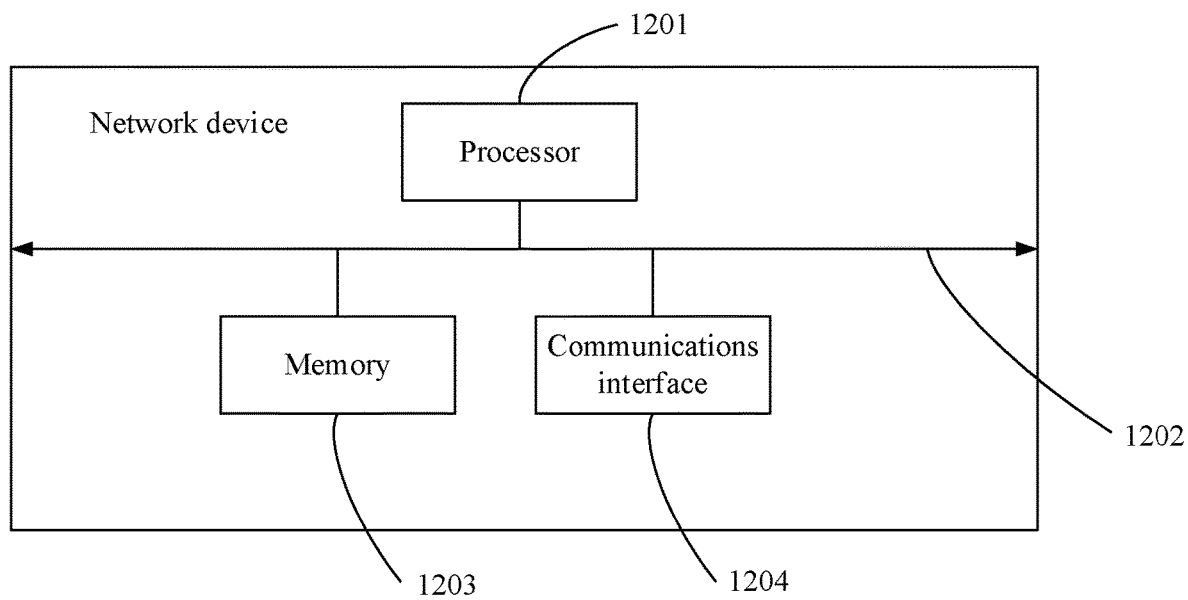
FIG. 12 is a schematic structural diagram 2 of a network device according to an embodiment of this application.

Based on a same technical concept, an embodiment of this application provides a first network device, configured to implement functions performed by the first network device in the foregoing method embodiments. Specifically, a hardware structure of the first network device may be shown in FIG. 12, and includes at least one processor 1201, a communications bus 1202, a memory 1203, and at least one communications interface 1204.

The processor 1201 may be a general-purpose central processing unit (CPU), a microprocessor, an application-specific integrated circuit ( ) or one or more integrated circuits for controlling program execution of the solutions of this application.

The communications bus 1202 may include a path in which information is transmitted between the foregoing components.

The communications interface 1204 is configured to communicate with another device or a communications network, such as the Ethernet, a radio access network (RAN), or a wireless local area network (WLAN) by using any apparatus such as a transceiver.

The memory 1203 may be a read-only memory (ROM) or another type of static storage device that can store static information and instructions; or a random access memory (RAM) or another type of dynamic storage device that can store information and instructions. The memory 1203 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that is accessible by a computer, but is not limited thereto. The memory may exist independently, and is connected to the processor by using a bus. The memory may alternatively be integrated with the processor.

The memory 1203 is configured to store application program code for performing the solutions of this application, and the processor 1201 controls the execution. The processor 1201 is configured to execute the application program code stored in the memory 1203, to implement the feature engineering orchestration methods provided in the foregoing embodiments of this application.

In one embodiment, in this embodiment of this application, the processor 1201 may perform a related function in the feature engineering orchestration methods provided in the foregoing embodiments of this application, and the communications interface 1204 is responsible for communication with the another device or the communications network. This is not specifically limited in this embodiment of this application.

In specific implementation, in an embodiment, the processor 1201 may include one or more CPUs.

In specific implementation, in an embodiment, the first network device may include a plurality of processors. Each of the processors may be a single-core (single-CPU) processor, or may be a multi-core (multi-CPU) processor. The processor herein may be one or more devices, circuits, and/or processing cores configured to process data (for example, a computer program instruction).

Based on a same technical concept, an embodiment of this application provides a second network device, configured to implement functions performed by the second network device in the foregoing method embodiments. Specifically, the second network device may include at least one processor, a communications bus, a memory, and at least one communications interface. For a connection relationship between the foregoing components, refer to FIG. 12.

The processor may be a general-purpose central processing unit, a microprocessor, an application-specific integrated circuit, or one or more integrated circuits for controlling program execution of the solutions of this application.

The communications bus may include a path in which information is transmitted between the foregoing components.

The communications interface is configured to communicate with another device or a communications network, such as the Ethernet, a radio access network, or a wireless local area network by using any apparatus such as a transceiver.

The memory may be a read-only memory or another type of static storage device that can store static information and instructions; or a random access memory or another type of dynamic storage device that can store information and instructions. The memory may alternatively be an electrically erasable programmable read-only memory, a compact disc read-only memory or another compact disc storage, optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that is accessible by a computer, but is not limited thereto. The memory may exist independently, and is connected to the processor by using a bus. The memory may alternatively be integrated with the processor.

The memory is configured to store application program code for performing the solutions of this application, and the processor controls the execution. The processor is configured to execute the application program code stored in the memory, to implement the feature engineering orchestration methods provided in the foregoing embodiments of this application.

In one embodiment, in this embodiment of this application, the processor may perform a related function in the feature engineering orchestration methods provided in the foregoing embodiments of this application, and the communications interface is responsible for communication with the another device or the communications network. This is not specifically limited in this embodiment of this application.

In specific implementation, in an embodiment, the processor may include one or more CPUs.

In specific implementation, in an embodiment, the second network device may include a plurality of processors. Each of the processors may be a single-core processor, or may be a multi-core processor. The processor herein may be one or more devices, circuits, and/or processing cores configured to process data (for example, a computer program instruction).

Based on a same technical concept, an embodiment of this application provides a third network device, configured to implement functions performed by the third network device in the foregoing method embodiments. Specifically, the third network device may include at least one processor, a communications bus, a memory, and at least one communications interface. For a connection relationship between the foregoing components, refer to FIG. 12.

The processor may be a general-purpose central processing unit, a microprocessor, an application-specific integrated circuit, or one or more integrated circuits for controlling program execution of the solutions of this application.

The communications bus may include a path in which information is transmitted between the foregoing components.

The communications interface is configured to communicate with another device or a communications network, such as the Ethernet, a radio access network, or a wireless local area network by using any apparatus such as a transceiver.

The memory may be a read-only memory or another type of static storage device that can store static information and instructions; or a random access memory or another type of dynamic storage device that can store information and instructions. The memory may alternatively be an electrically erasable programmable read-only memory, a compact disc read-only memory or another compact disc storage, optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that is accessible by a computer, but is not limited thereto. The memory may exist independently, and is connected to the processor by using a bus. The memory may alternatively be integrated with the processor.

The memory is configured to store application program code for performing the solutions of this application, and the processor controls the execution. The processor is configured to execute the application program code stored in the memory, to implement the feature engineering orchestration methods provided in the foregoing embodiments of this application.

In one embodiment, in this embodiment of this application, the processor may perform a related function in the feature engineering orchestration methods provided in the foregoing embodiments of this application, and the communications interface is responsible for communication with the another device or the communications network. This is not specifically limited in this embodiment of this application.

In specific implementation, in an embodiment, the processor may include one or more CPUs.

In specific implementation, in an embodiment, the third network device may include a plurality of processors. Each of the processors may be a single-core processor, or may be a multi-core processor. The processor herein may be one or more devices, circuits, and/or processing cores configured to process data (for example, a computer program instruction).

Based on a same technical concept, this application further provides a communications system, including the first network device and the second network device, or may include the first network device, the second network device, and the third network device.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

What is claimed is:

1. A feature engineering orchestration method applied to a radio access network (RAN) or a core network, comprising:
    receiving, by a first network device from a second network device, first indication information comprising first method indication information and first data type indication information, wherein each of the first network device and the second network device is a base station, a central unit (CU) or a distributed unit (DU) of the base station, a radio access network data analysis (RANDA) element, or a core network element;
    performing, by the first network device by using a method indicated by the first method indication information, a feature extraction on data indicated by the first data type indication information, to obtain feature data; and
    sending, by the first network device to the second network device, the feature data.

2. The method according to claim 1, wherein the first indication information further comprises first method parameter information, and wherein the first method parameter information includes information about a parameter required when the method indicated by the first method indication information is used.

3. The method according to claim 1, wherein after the sending, by the first network device, the feature data to the second network device, the method further comprises:
    receiving, by the first network device, model information from the second network device, wherein the model information is obtained by performing a model training based on the feature data; and
    performing, by the first network device, a data prediction based on the model information.

4. The method according to claim 3, wherein the model information comprises model algorithm information and input feature information of a model; and
    the performing, by the first network device, a data prediction based on the model information comprises:
    obtaining, by the first network device, an input feature vector based on the input feature information; and
    performing, by the first network device, the data prediction based on the input feature vector and the model algorithm information.

5. The method according to claim 4, wherein the input feature information comprises second method indication information and second data type indication information; and
    the obtaining, by the first network device, an input feature vector based on the input feature information comprises:
    performing, by the first network device by using a method indicated by the second method indication information, a feature extraction on data indicated by the second data type indication information, to obtain the input feature vector.

6. The method according to claim 4, wherein the input feature information further comprises second method parameter information, and wherein the second method parameter information includes information about a parameter required when the method indicated by second method indication information is used.

7. The method according to claim 1, wherein after the sending, by the first network device, the feature data to the second network device, the method further comprises:
    receiving, by the first network device, second indication information from a third network device, wherein the second indication information comprises third method indication information and third data type indication information;
    performing, by the first network device by using a method indicated by the third method indication information, a feature extraction on data indicated by the third data type indication information, to obtain an input feature vector; and
    sending, by the first network device, the input feature vector to the third network device.

8. The method according to claim 7, wherein input feature information further comprises third method parameter information, and wherein the third method parameter information includes information about a parameter required when the method indicated by the third method indication information is used.

9. A feature engineering orchestration method applied to a radio access network (RAN) or a core network, comprising:
    sending, by a second network device to a first network device, first indication information comprising first method indication information and first data type indication information, wherein each of the first network device and the second network device is a base station, a central unit (CU) or a distributed unit (DU) of the base station, a radio access network data analysis (RANDA) element, or a core network element;
    receiving, by the second network device from the first network device, feature data obtained by performing, by using a method indicated by the first method indication information, a feature extraction on data indicated by the first data type indication information.

10. The method according to claim 9, further comprising:
    performing, by the second network device, a model training based on the feature data; and
    sending, by the second network device to the first network device, model information obtained through the model training, wherein the model information is used for a data prediction.

11. The method according to claim 9, further comprising:
    performing, by the second network device, a model training based on the feature data; and
    sending, by the second network device to a third network device, model information obtained through the model training, wherein the model information is used for a data prediction.

12. The method according to claim 10, wherein the model information comprises model algorithm information and input feature information; and
    wherein the input feature information is used to obtain an input feature vector, and wherein the input feature vector and the model algorithm information are used for the data prediction.

13. The method according to claim 12, wherein the input feature information comprises second method indication information and second data type indication information, and wherein the input feature information is used to indicate to perform, by using a method indicated by the second method indication information, a feature extraction on data indicated by the second data type indication information, to obtain the input feature vector.

14. The method according to claim 12, wherein the input feature information further comprises second method parameter information, and wherein the second method parameter information includes information about a parameter required when the method indicated by second method indication information is used.

15. The method according to claim 9, wherein the first indication information further comprises first method parameter information, and wherein the first method parameter information includes information about a parameter required when the method indicated by the first method indication information is used.

16. An apparatus applied to a radio access network (RAN) or a core network, wherein the apparatus comprises a processor, a memory, and a communications interface, wherein the memory is configured to store a program, and the processor invokes the program stored in the memory, to perform:
- receiving, from a second network device, first indication information comprising first method indication information and first data type indication information, wherein each of the apparatus and the second network device is a base station, a central unit (CU) or a distributed unit (DU) of the base station, a radio access network data analysis (RANDA) element, or a core network element;
- performing, by using a method indicated by the first method indication information, a feature extraction on data indicated by the first data type indication information, to obtain feature data; and
- sending, to the second network device, the feature data.

17. The apparatus according to claim 16, wherein the first indication information further comprises first method parameter information, and wherein the first method parameter information includes information about a parameter required when the method indicated by the first method indication information is used.

18. The apparatus according to claim 16, wherein after sending the feature data to the second network device, the processor invokes the program stored in the memory, to further perform:
- receiving model information from the second network device, wherein the model information is obtained by performing model training based on the feature data; and
- performing a data prediction based on the model information.

19. The apparatus according to claim 18, wherein the model information comprises model algorithm information and input feature information of a model; and
the processor invokes the program stored in the memory, to perform:
- obtaining an input feature vector based on the input feature information; and
- performing the data prediction based on the input feature vector and the model algorithm information.

20. The apparatus according to claim 19, wherein the input feature information comprises second method indication information and second data type indication information; and
the processor invokes the program stored in the memory, to perform:
- performing, by using a method indicated by the second method indication information, a feature extraction on data indicated by the second data type indication information, to obtain the input feature vector.

* * * * *